(12) United States Patent
Propheter-Hinckley

(10) Patent No.: US 10,662,782 B2
(45) Date of Patent: May 26, 2020

(54) AIRFOIL WITH AIRFOIL PIECE HAVING AXIAL SEAL

(71) Applicant: United Technologies Corporation, Farmington, CT (US)

(72) Inventor: Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 702 days.

(21) Appl. No.: 15/353,942

(22) Filed: Nov. 17, 2016

(65) Prior Publication Data

US 2018/0135428 A1   May 17, 2018

(51) Int. Cl.
*F01D 5/18*   (2006.01)
*F01D 9/04*   (2006.01)
(Continued)

(52) U.S. Cl.
CPC ............. *F01D 5/187* (2013.01); *F01D 5/147* (2013.01); *F01D 5/186* (2013.01); *F01D 5/188* (2013.01); *F01D 5/282* (2013.01); *F01D 5/284* (2013.01); *F01D 9/041* (2013.01); *F01D 25/12* (2013.01); *F02C 3/04* (2013.01); *F04D 29/023* (2013.01); *F04D 29/324* (2013.01); *F04D 29/541* (2013.01); *F04D 29/582* (2013.01);
(Continued)

(58) Field of Classification Search
CPC .......... F01D 9/041; F01D 5/284; F01D 5/147; F01D 5/187; F01D 5/282; F01D 5/188; F01D 5/186; F01D 25/12; F05D 2300/6033; F05D 2240/35; F05D 2260/202; F05D 2300/20; F05D 2240/55; F05D 2240/303; F05D 2240/121; F02C 3/04; F04D 29/023; F04D 29/541; F04D 29/582; F04D 29/324; Y02T 50/676; Y02T 50/672

See application file for complete search history.

(56) References Cited

U.S. PATENT DOCUMENTS 3,215,511 A    11/1965  Chisholm
3,990,810 A *  11/1976  Amos .................. F01D 17/162
                                              415/161
(Continued)

FOREIGN PATENT DOCUMENTS

EP    0764764    3/1997
EP    1087103    3/2001
(Continued)

OTHER PUBLICATIONS

U.S. Appl. No. 13/429,474, filed Mar. 26, 2012.
(Continued)

*Primary Examiner* — Dwayne J White
*Assistant Examiner* — Adam W Brown
(74) *Attorney, Agent, or Firm* — Carlson, Gaskey & Olds, P.C.

(57) ABSTRACT

An airfoil includes an airfoil section that defines an airfoil profile. The airfoil section includes first and second airfoil pieces. The first airfoil piece defines a portion of the airfoil profile and has a first slot. The second airfoil piece defines a different portion of the airfoil profile and has a second slot. The first slot and the second slot together form a seal slot, and a seal is disposed in the seal slot.

11 Claims, 3 Drawing Sheets

(51) Int. Cl.
*F01D 5/28* (2006.01)
*F01D 25/12* (2006.01)
*F04D 29/58* (2006.01)
*F04D 29/32* (2006.01)
*F04D 29/54* (2006.01)
*F04D 29/02* (2006.01)
*F02C 3/04* (2006.01)
*F01D 5/14* (2006.01)

(52) U.S. Cl.
CPC .. *F05D 2240/121* (2013.01); *F05D 2240/303* (2013.01); *F05D 2240/35* (2013.01); *F05D 2240/55* (2013.01); *F05D 2260/202* (2013.01); *F05D 2300/20* (2013.01); *F05D 2300/6033* (2013.01); *Y02T 50/672* (2013.01); *Y02T 50/676* (2013.01)

(56) References Cited

U.S. PATENT DOCUMENTS

| | | | |
|---|---|---|---|
| 4,097,187 A * | 6/1978 | Korta | F01D 17/162 415/161 |
| 4,137,008 A | 1/1979 | Grant et al. | |
| 4,247,259 A | 1/1981 | Saboe et al. | |
| 4,396,349 A | 8/1983 | Hueber | |
| 4,897,020 A * | 1/1990 | Tonks | F01D 5/186 415/115 |
| 4,914,794 A | 4/1990 | Strangman | |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,827,045 A * | 10/1998 | Beeck | F01D 5/284 416/96 A |
| 5,951,892 A | 9/1999 | Wolfla et al. | |
| 6,000,906 A | 12/1999 | Draskovich | |
| 6,102,656 A | 8/2000 | Nissley et al. | |
| 6,200,092 B1 * | 3/2001 | Koschier | F01D 5/146 415/191 |
| 6,224,963 B1 | 5/2001 | Strangman | |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 * | 6/2012 | Liang | F01D 5/282 416/224 |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,556,578 B1 | 10/2013 | Memmen et al. | |
| 8,821,124 B2 | 9/2014 | Viens et al. | |
| 9,017,035 B2 * | 4/2015 | Marmilic | F01D 5/14 416/223 A |
| 9,611,755 B2 * | 4/2017 | Memmen | F01D 25/12 |
| 9,803,559 B2 * | 10/2017 | Burdick | F02C 3/04 |
| 2008/0159850 A1 | 7/2008 | Tholen et al. | |
| 2010/0136258 A1 | 6/2010 | Strock et al. | |
| 2012/0163960 A1 * | 6/2012 | Ress, Jr. | F01D 17/162 415/173.1 |
| 2016/0090851 A1 | 3/2016 | Carr et al. | |
| 2016/0194978 A1 | 7/2016 | Memmen | |

FOREIGN PATENT DOCUMENTS

| | | |
|---|---|---|
| EP | 1764481 | 3/2007 |
| EP | 2105579 | 9/2009 |
| EP | 2853688 | 4/2015 |
| EP | 2975217 | 1/2016 |
| GB | 2272453 | 5/1994 |
| JP | 61066802 | 4/1986 |
| JP | 05321602 | 12/1993 |

OTHER PUBLICATIONS

U.S. Appl. No. 14/659,718, filed Mar. 17, 2015.
U.S. Appl. No. 14/812,668, filed Jul. 29, 2015.
The Extended European Search Report for EP Application No. 17202379.8, dated Mar. 23, 2018.

* cited by examiner

AIRFOIL WITH AIRFOIL PIECE HAVING AXIAL SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an airfoil profile. The airfoil section includes a first airfoil piece that defines a portion of the airfoil profile and has a first slot. A second airfoil piece is located adjacent the first airfoil piece. The second airfoil piece defines a different portion of the airfoil profile and has a second slot. The first slot and the second slot together form a first seal slot, and a first seal is disposed in the first seal slot.

In a further embodiment of any of the foregoing embodiments, the first seal is a feather seal.

In a further embodiment of any of the foregoing embodiments, the feather seal includes through-holes.

In a further embodiment of any of the foregoing embodiments, the first airfoil piece defines a leading end of the airfoil profile.

In a further embodiment of any of the foregoing embodiments, the first airfoil piece is formed of ceramic.

In a further embodiment of any of the foregoing embodiments, the first airfoil piece is hollow.

In a further embodiment of any of the foregoing embodiments, the first slot and the second slot are axial slots.

In a further embodiment of any of the foregoing embodiments, the first airfoil piece includes a third slot spaced apart from the first slot and the second airfoil piece includes a fourth slot spaced apart from the second slot. The third slot and the fourth slot together form a second seal slot, and a second seal disposed in the second seal slot.

In a further embodiment of any of the foregoing embodiments, the first airfoil piece. The second airfoil piece, the first seal, and the second seal define a passage there between. The second airfoil piece includes an internal cavity and a cooling hole that opens on one end to the internal cavity and at another end to the passage.

In a further embodiment of any of the foregoing embodiments, the first airfoil piece defines a leading end of the airfoil profile. The first airfoil piece is formed of ceramic, the first airfoil piece is hollow, the first slot and the second slot are axial slots, and the first seal is a feather seal.

In a further embodiment of any of the foregoing embodiments, the feather seal includes through-holes.

In a further embodiment of any of the foregoing embodiments, the second airfoil piece includes an axial face that has the second axial slot, an internal cavity, and a cooling hole that opens on one end to the internal cavity and at another end to the axial face adjacent the second axial slot.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil section that defines an airfoil profile. The airfoil section includes a first airfoil piece that defines a portion of the airfoil profile and has a first slot. A second airfoil piece is located adjacent the first airfoil piece. The second airfoil piece defines a different portion of the airfoil profile and has a second slot. The first slot and the second slot together form a first seal slot, and a first seal is disposed in the first seal slot.

In a further embodiment of any of the foregoing embodiments, the first airfoil piece defines a leading end of the airfoil profile. The first airfoil piece is formed of ceramic, the first airfoil piece is hollow, the first slot and the second slot are axial slots, and the first seal is a feather seal.

In a further embodiment of any of the foregoing embodiments, the first airfoil piece includes a third slot spaced apart from the first slot and the second airfoil piece includes a fourth slot spaced apart from the second slot. The third slot and the fourth slot together form a second seal slot, and a second seal disposed in the second seal slot.

In a further embodiment of any of the foregoing embodiments, the first airfoil piece, the second airfoil piece, the first seal, and the second seal define a passage there between. The second airfoil piece includes an internal cavity and a cooling hole that opens on one end to the internal cavity and at another end to the passage.

An article according to an example of the present disclosure includes an airfoil piece that defines a portion of an airfoil profile. The airfoil piece has an axial face and an axial slot in the axial face. The axial slot is configured to receive a seal.

A further embodiment of any of the foregoing embodiments include the seal partially disposed in the axial slot.

In a further embodiment of any of the foregoing embodiments, the airfoil piece is hollow and is formed of ceramic.

In a further embodiment of any of the foregoing embodiments, the airfoil piece includes another axial slot in the axial face, and the axial slots are parallel.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
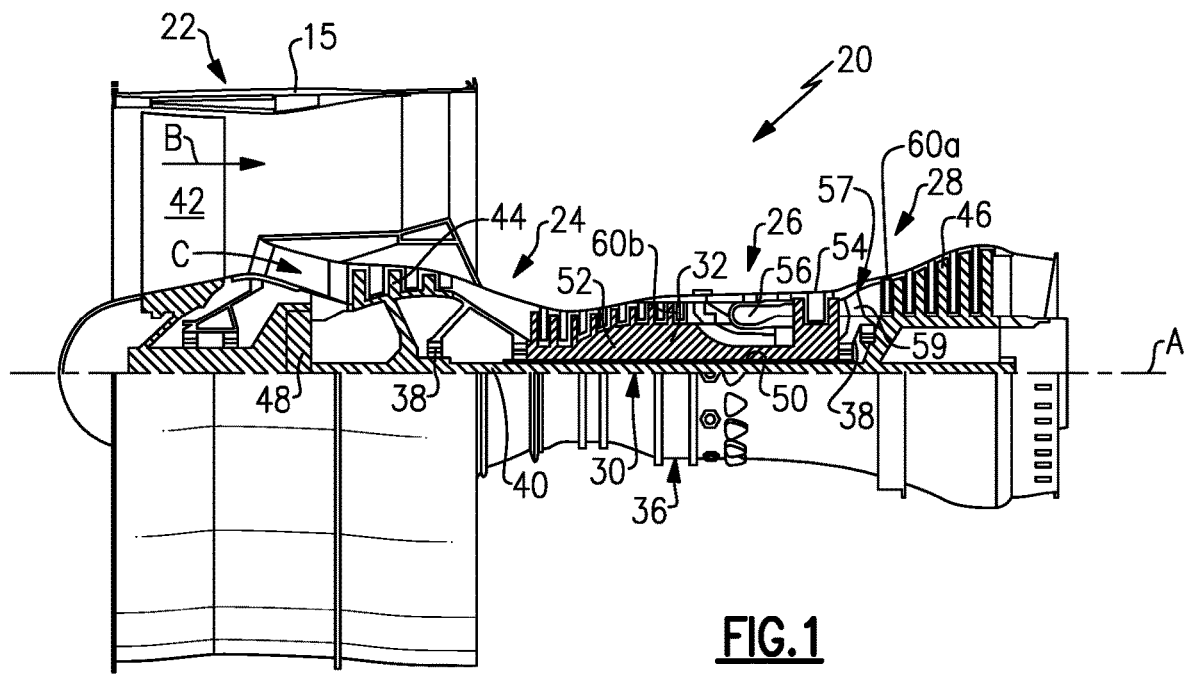
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
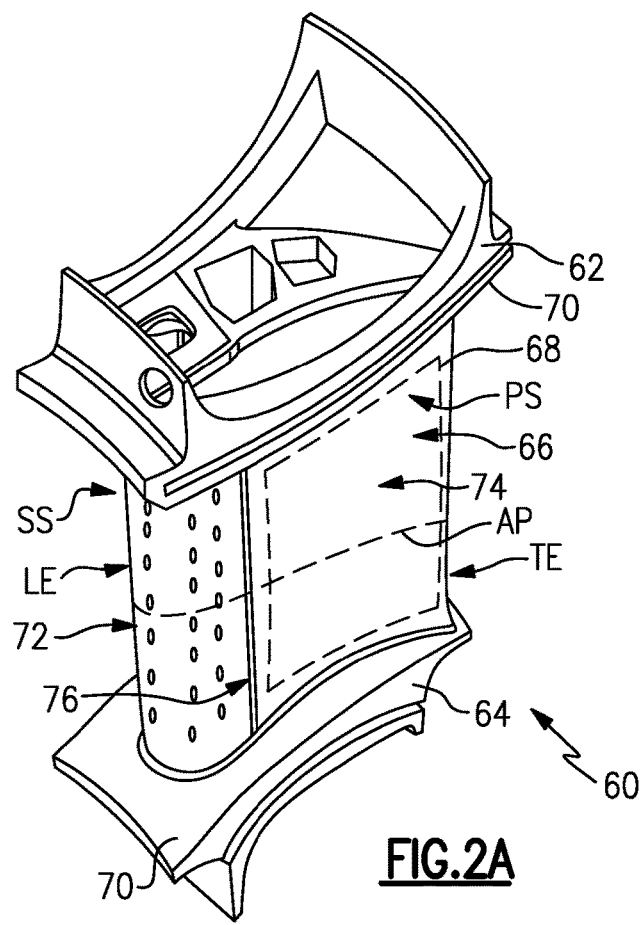
FIG. 2A illustrates an example airfoil of the gas turbine engine.
Figure 2B:
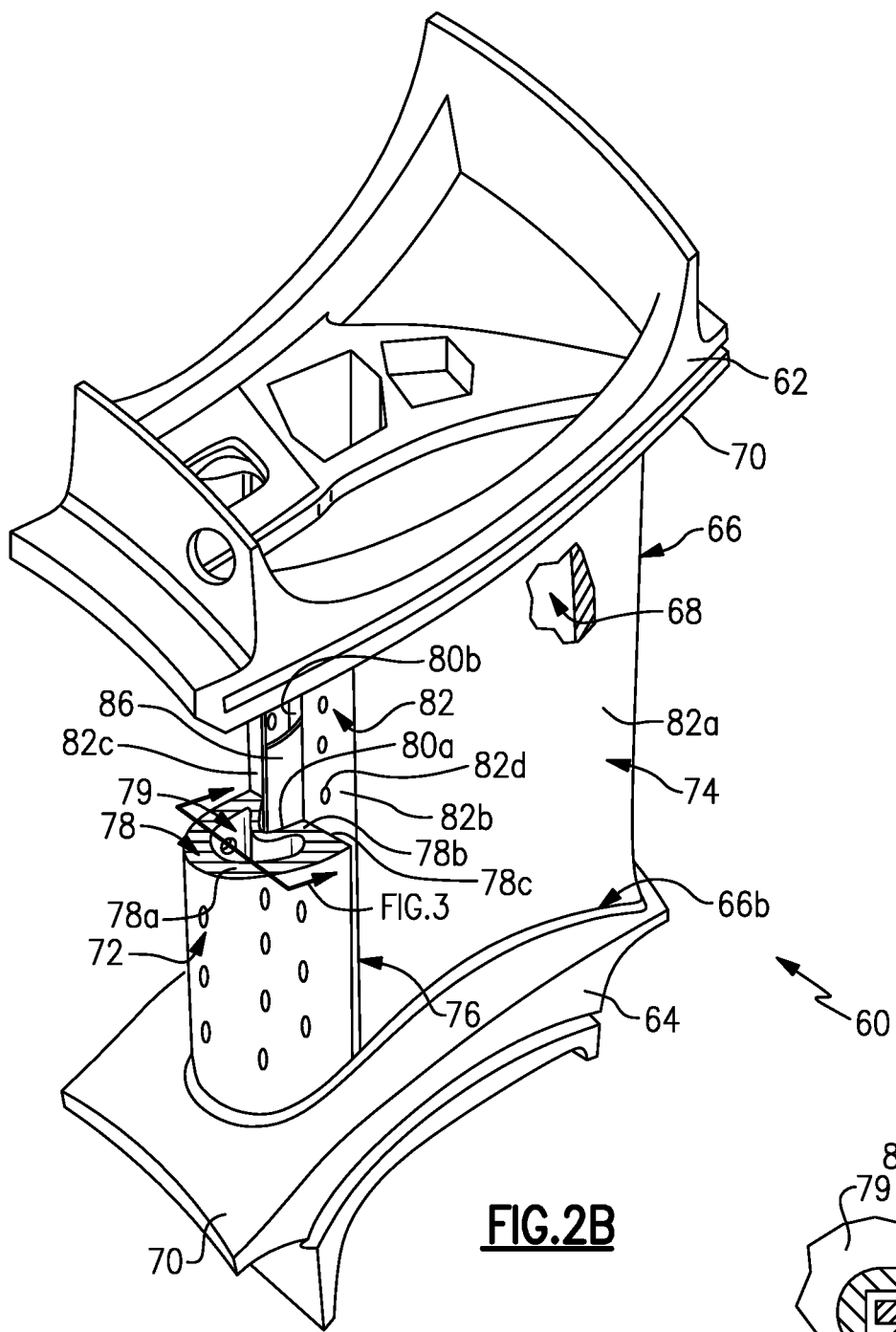
FIG. 2B illustrates a cut away view of the airfoil of FIG. 2A.

FIG. 2A illustrates an example airfoil 60 used in the engine 20, and FIG. 2B illustrates a partially cut away view of the airfoil 60. For instance, the airfoil 60 can be a turbine vane, as represented at 60a in FIG. 1, or a compressor vane, as represented at 60b in FIG. 1. In this example, the airfoil 60 is a static vane. As will be appreciated, although the examples herein are described in the context of a vane, this disclosure is not limited to vanes, and the examples may also be applicable to blades or other airfoils that are exposed to high temperatures.

The airfoil 60 includes a first or outer end section 62, a second or inner end section 64, and an airfoil section 66 that spans in a longitudinal direction between the first and second end sections 62/64. The longitudinal direction is also the radial direction in the engine 20 with regard to the engine central axis A. The airfoil section 66 defines at least a portion of an airfoil profile (AP), which is the peripheral shape of the airfoil section 66 when viewed in a radial direction. For example, the airfoil profile (AP) has a wing-like shape that provides a reaction force via Bernoulli's principle with regard to flow over the airfoil section 66. The full or complete airfoil profile (AP) generally includes a leading end (LE), a trailing end (TE), a pressure side (PS), and a suction side (SS).

The airfoil section 66 may be hollow and include one or more internal cavities 68. The internal cavity or cavities 68 may be provided with cooling bleed air from the compressor section 24 of the engine 20, to cool the airfoil 60. In this example of a static vane, and the end sections 62/64 include respective platforms 70. Together, the platforms 70 provide the inner and outer bounds of the core gas path.

The airfoil section 66 is formed from several airfoil pieces, including a first airfoil piece 72 and a second airfoil piece 74. In this example, the first airfoil piece 72 defines the leading end (LE) of the airfoil profile (AP) and the second airfoil piece 74 defines the suction side (SS), pressure side (PS), and trailing end (TE). As will be appreciated, although the illustrated example includes only two airfoil pieces for the full airfoil profile (AP), the airfoil section 66 could be formed of more than two airfoil pieces.

The end sections 62/64 and the airfoil pieces 72/74 are most typically separate pieces initially. The airfoil pieces 72/74 may be mechanically clamped between the end sections 62/64 by a tie member (not shown) or other mechanical fastener device. In this regard, the airfoil pieces 72/74 may fit with the end sections 62/64 to ensure proper positioning of the airfoil pieces 72/74. As an example, the airfoil pieces 72/74 interfit with the end sections 62/64 such that the exterior surfaces of the airfoil pieces 72/74 are substantially flush with the exterior surfaces of the end sections 62/64. For instance, the end sections 62/64 may have a recess, a lip, or the like that fits with the airfoil pieces 72/74.

The airfoil pieces 72/74 are situated adjacent to each other, with a seam or joint 76 there between. There is the potential that gases in the core gas path leak into the airfoil 60 through the seam 76. For instance, the pressure on the pressure side (PS) of the airfoil piece 66 is higher than the pressure on the suction side (SS) and there is, therefore, a tendency for the gas to migrate from the core gas path into the seam 76. As will be described in more detail below, the airfoil 60 includes features to facilitate limiting this leak of gas from the core gas path.

With reference to the cut away view in FIG. 2B, the first airfoil piece 72 includes a wall 78 that defines an internal cavity 79. The wall 78 includes an exterior wall portion 78a and an interior wall portion 78b. The exterior wall portion 78a is directly exposed in the core gas path, and the interior wall portion 78b is not directly exposed to the core gas path. The interior wall portion 78b has an axial face 78c, and there is a first slot 80a in the axial face 78c.

The second airfoil piece 74 includes a wall 82 that defines the internal cavity 68 (shown in a cut away portion in FIG. 2B). The wall 82 includes an exterior wall portion 82a and an interior wall portion 82b. The exterior wall portion 82a is directly exposed in the core gas path, and the interior wall portion 82b is not directly exposed to the core gas path. The interior wall portion 82b has an axial face 82c, and there is a second slot 80b in the axial face 82c. The second airfoil piece 74 may also include one or more cooling holes 82d. The cooling holes 82d open on one end to the internal cavity 68 and on the other end to the axial face 82c adjacent the second slot 80b. Cooling bleed air from the internal cavity 68 may be fed through the cooling holes 82d for providing impingement cooling on the axial face 78c of the first airfoil piece 72.

Figure 3:
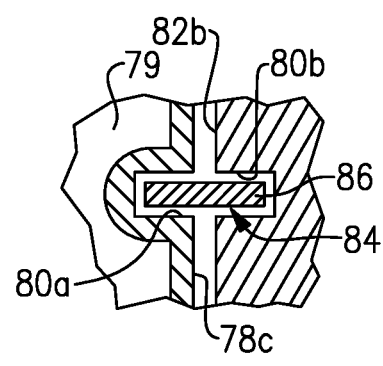
FIG. 3 illustrates a sectioned view through a seal slot and seal.

The slots 80a/80b are axial slots that face in opposite axial directions. As also shown in a sectioned view in FIG. 3, the slots 80a/80b align and together form a seal slot 84. A seal 86 is disposed in the seal slot 84. For example, prior to bringing the slots 80a/80b together, the seal 86 is disposed in one or the other of the slots 80a/80b.

In the illustrated example, the seal 86 is a feather seal. The feather seal may be a relatively thin, flat sheet of metal and may be flexible. Once the slots 80a/80b are brought together to form the seal slot 84, the seal 86 is captured in the seal slot 84. In this example, the seal 86 serves as a type of labyrinth seal to block gas from migrating across the airfoil section 66 between the airfoil pieces 72/74, from the pressure side (PS) to the suction side (SS).

Figure 4:
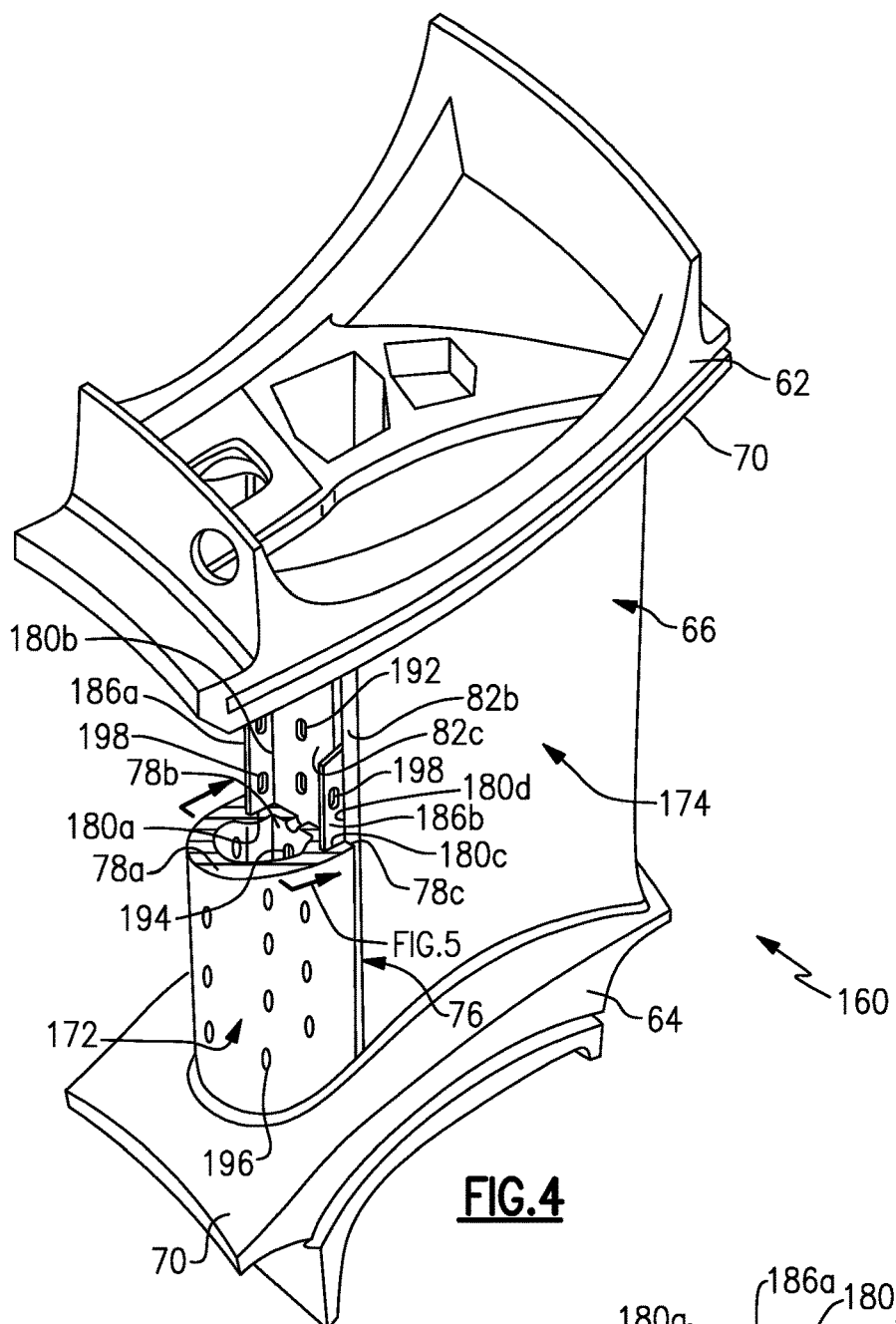
FIG. 4 illustrates another example airfoil.
Figure 5:
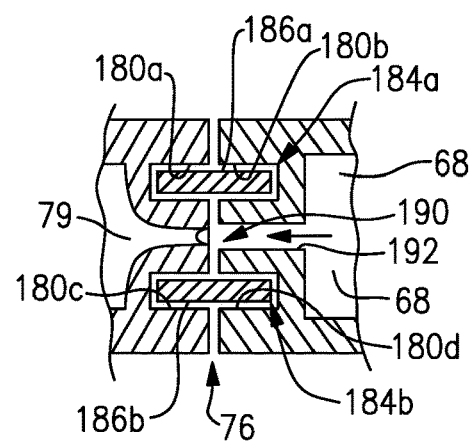
FIG. 5 illustrates a sectioned view through two seal slots and two seals.

FIG. 4 illustrates another example airfoil 160. In this disclosure like reference numerals designate like elements where appropriate and reference numerals with the addition of one-hundred or multiples thereof designate modified elements that are understood to incorporate the same features and benefits of the corresponding elements. Here, there are two seals 186a/186b. As shown in the sectioned view in FIG. 5, the first airfoil piece 172 has a first slot 180a and the second airfoil piece 174 has a second slot 180b. The first airfoil piece 172 also includes a third slot 180c and the second airfoil piece 174 also includes a fourth slot 180d. The slots 180a/180b form a first seal slot 184a, and the slots 180c/180d form a second seal slot 184b. A first seal 186a is disposed in the first seal slot 184a, and a second seal 186b is disposed in the second seal slot 184b.

The axial face 78c of the first airfoil piece 172, the axial face 82c of the second airfoil piece 174, and the seals 186a/186b together define a passage 190. The axial face 82c of the second airfoil piece 174 also includes a plurality of cooling holes 192. Each cooling holes opens on one end to the passage 190 and on its other end to the cavity 68 in the second airfoil piece 174. Cooling bleed air provided to the cavity 68 flows through the cooling holes 192 into the passage 190 and impinges on the axial face 78c of the first airfoil piece 172. The axial face 78c of the first airfoil piece 172 may also include cooling holes 194 (FIG. 4). The air in the passage 190 may flow through the holes 194 into the cavity 79 in the first airfoil piece 172 to cool the exterior wall 78a. The exterior wall 78a may include cooling holes 196 to discharge the air into the core gas path, for film cooling.

As shown in FIG. 4, one or both of the seals 186a/186b may also include through-holes 198 for managing flow of the cooling bleed air in the passage 190. For example, the holes 198 are sized such that a portion of the air is discharged through the holes 198 along the seam 76 and then discharged at the edge of the seam 76 into the core gas path for film cooling.

Should the airfoil pieces 72/172/74/174 require replacement, the airfoil 60/160 can be disassembled, one or more of the airfoil pieces 72/172/74/174 can be replaced with a new one, and the airfoil 60/160 can be reassembled. Accordingly, the airfoil pieces 72/172/74/174 can be produced individually as new articles for original airfoils 60/160 or as individual replacement articles for existing airfoils.

The materials of which the airfoil 60/160 is formed of may be selected to enhance the performance. For example, the airfoil pieces 72/172/74/174 may be formed of a ceramic or of a metal. For instance, the airfoil piece 72/172 is ceramic and the airfoil piece 74/174 is metal. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. Ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

If enhanced thermal or environmental resistance is desired, the airfoil pieces 72/172/74/174 may be coated with a thermal and/or environmental barrier ceramic coating, including but not limited to segmented coatings. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section defining an airfoil profile, the airfoil section including
        a first airfoil piece defining a portion of the airfoil profile, the first airfoil piece having a first slot a third slot spaced apart from the first slot,
        a second airfoil piece adjacent the first airfoil piece, the second airfoil piece defining a different portion of the airfoil profile, and the second airfoil piece having a second slot and a fourth slot spaced apart from the second slot, the first slot and the second slot together forming a first seal slot and the third slot and the fourth slot together form a second seal slot, and
        a first seal disposed in the first seal slot and a second seal disposed in the second seal slot, wherein the first airfoil piece defines a leading end of the airfoil profile and the second airfoil piece defines a pressure side, a suction side, and a trailing end of the airfoil profile, the firm airfoil piece, the second airfoil piece, the first seal, and the second seal defining a passage there between, the second airfoil piece including a second airfoil piece internal cavity and a plurality of second airfoil piece cooling holes that open on one end to the second airfoil piece internal cavity and at another end to the passage.

2. The airfoil as recited in claim 1, wherein the first seal is a feather seal.

3. The airfoil as recited in claim 2, wherein the feather seal includes through-holes.

4. The airfoil as recited in claim 1, wherein the first airfoil piece defines a leading end of the airfoil profile.

5. The airfoil as recited in claim 4, wherein the first airfoil piece is formed of ceramic.

6. The airfoil as recited in claim 5, wherein the first airfoil piece is hollow.

7. The airfoil as recited in claim 1, wherein the first slot and the second slot are axial slots.

8. The airfoil as recited in claim 1, wherein the first airfoil piece includes a first airfoil piece internal cavity and a plurality of first airfoil piece cooling holes that open on one end to the first airfoil piece internal cavity and at another end to the passage so as to form a flow circuit through between the second airfoil piece internal cavity, the passage, and the first airfoil piece internal cavity.

9. The airfoil as recited in claim 8, wherein the first airfoil piece is ceramic and the second airfoil piece is metal.

10. A gas turbine engine comprising:
    a compressor section;
    a combustor in fluid communication with the compressor section; and
    a turbine section in fluid communication with the combustor,
    at least one of the turbine section or the compressor section including an airfoil having an airfoil section defining an airfoil profile, the airfoil section including
        a first airfoil piece defining a portion of the airfoil profile, the first airfoil piece having a first slot a third slot spaced apart from the first slot,
        a second airfoil piece adjacent the first airfoil piece, the second airfoil piece defining a different portion of the airfoil profile, and the second airfoil piece having a second slot and a fourth slot spaced apart from the second slot, the first slot and the second slot together forming a first seal slot and the third slot and the fourth slot together form a second seal slot, and
        a first seal disposed in the first seal slot and a second seal disposed in the second seal slot, wherein the first airfoil piece defines a leading end of the airfoil profile and the second airfoil piece defines a pressure side, a suction side, and a trailing end of the airfoil profile, the first airfoil piece, the second airfoil piece, the first seal, and the second seal define a passage there between, the second airfoil piece includes a second airfoil piece internal cavity and a plurality of second airfoil piece cooling holes that open on one end to the second airfoil piece internal cavity and at another end to the passage.

11. An airfoil comprising:

an airfoil section defining an airfoil profile, the airfoil section including
  a first airfoil piece defining a portion of the airfoil profile, the first airfoil piece having a first slot a third slot spaced apart from the first slot,
  a second airfoil piece adjacent the first airfoil piece, the second airfoil piece defining a different portion of the airfoil profile, and the second airfoil piece having a second slot and a fourth slot spaced apart from the second slot, the first slot and the second slot together forming a first seal slot and the third slot and the fourth slot together form a second seal slot, and
a first seal disposed in the first seal slot and a second seal disposed in the second seal slot, wherein the first airfoil piece is ceramic and the second airfoil piece is metal, the first airfoil piece defines a leading end of the airfoil profile and the second airfoil piece defines a pressure side, a suction side, and a trailing end of the airfoil profile, the first airfoil piece, the second airfoil piece, the first seal, and the second seal define a passage there between, the first airfoil piece includes a first airfoil piece internal cavity and a plurality of first airfoil piece cooling holes that open on one end to the first airfoil piece internal cavity and at another end to the passage.

* * * * *